DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 30, 1969

869 O.G. 1386

T869,021

PROCESS FOR PLATING PLASTICS

Raymond E. Sutherland, 1841 Azrock Drive, Knoxville, Tenn.

Continuation-in-part of application Ser. No. 529,261, Feb. 23, 1966. This application June 26, 1969, Ser. No. 836,993

Int. Cl. B44d *1/14, 1/22, 1/44*

U.S. Cl. 117—71

No Drawing. 17 Pages Specification

A process for electroless depositing a layer of metal on a thermoplastic material including the steps of coating the surface of the thermoplastic material with a lacquer carrier containing an acrylonitrile-butadiene-styrene composition, subjecting the coated article to treatment by a strong acid solution as a conditioning step, sensitizing the surface of the coated article by absorbing on the surface a material which is readily oxidized, activating the surface by exposing it to a solution of a noble metal which is reduced by the sensitizer to fine deposits of the free metal to insure the complete deposition of a catalytic metal on the surface, and immersing it in an electroless plating solution from which a metal is bonded directly and strongly to the coating on the thermoplastic material.